May 15, 1962   J. E. VARRALL ET AL   3,035,218
POSITION CONTROL MEANS
Filed Sept. 10, 1958   5 Sheets-Sheet 1

INVENTORS
JOHN EUSTON VARRALL
GILBERT FRANCIS PENVER
BY
Irwin S. Thompson
ATTORNEY INVENTORS
JOHN EUSTON VARRALL
GILBERT FRANCIS PENVER
BY
Irwin S. Thompson
ATTORNEY

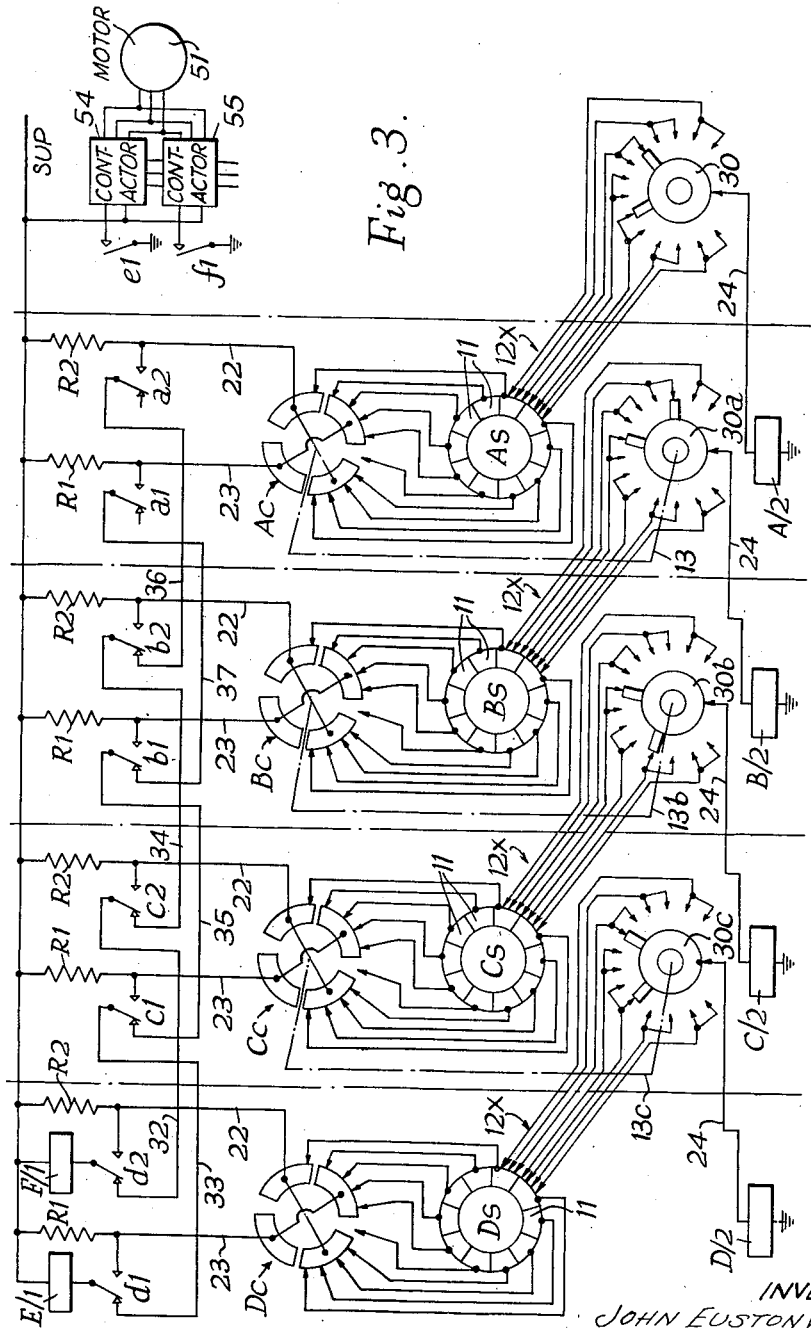

INVENTORS
JOHN EUSTON VARRALL
GILBERT FRANCIS PENVER
BY Irwin S. Thompson
ATTORNEY

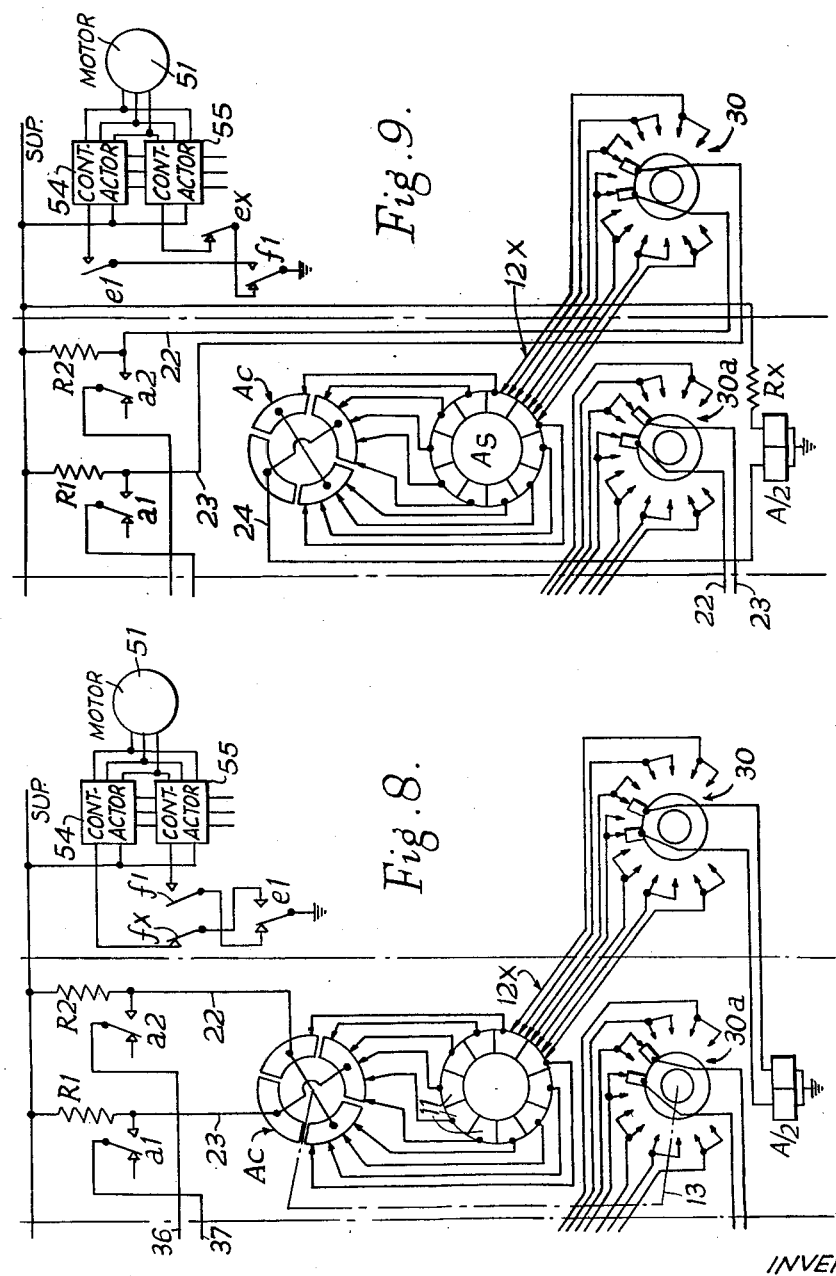

United States Patent Office 3,035,218
Patented May 15, 1962

3,035,218
POSITION CONTROL MEANS
John Euston Varrall, Bourne End, and Gilbert Francis Penver, High Wycombe, England, assignors to Airmec Limited, High Wycombe, England, a British company
Filed Sept. 10, 1958, Ser. No. 760,119
Claims priority, application Great Britain Sept. 16, 1957
17 Claims. (Cl. 318—467)

This invention relates to electric control means for controlling the position of a power driven movable object, such as a rotatable shaft, and is more particularly, although not exclusively, concerned with the accurate positioning of a power driven rotatable shaft in a chosen angular position relative to a datum position by electrically operated means in response to predetermined data which may be set up by manually operable electric switch mechanism in a control device either near to or remote from the shaft or by equivalent electric switch mechanism controlled by input electric signals such as, for instance, from a programming device including a data storage system of the punched card, punched tape or magnetic tape type. The range of angular position control of a shaft or the like may extend over the whole or a part of a 360° arc or a number of complete revolutions plus an angular displacement of less than 360°. Particular applications of the invention are to the automatic control of lead screws and the like in machine tools, rotary valves and tuning controls in radio and like electronic apparatus.

One already known arrangement for effecting electric control of the position of a power driven shaft consists of a first rotatable member provided with two electrically conductive segments and a co-operating second rotatable member co-axial with the first member and provided with a wiper contact adapted to sweep over such segments. Such first and second members are mechanically coupled one to the shaft whose position is to be controlled and the other to a rotatable element, such as a controlling shaft whose angular setting position indicates the required position of the controlled shaft. A neutral or insulated gap, at least equal to the width of the wiper contact, separates two of the adjacent ends of said segments which are connected respectively in circuits of a motor drive system completed through said wiper contact and producing either forward or backward rotation of the controlled shaft, whereby the latter is rotated in the appropriate direction until the wiper contact is brought into register with the insulated gap. This arrests the motor drive with the controlled shaft in the required position. To alter the angular position of such controlled shaft, the rotatable controlling element is moved until the insulated gap is in the required new position whereupon the above described operation is repeated.

In another and broadly similar arrangement for producing power drive of a rotatable member, such as the tuning condenser of a broadcast radio receiver, to any one of a number of predetermined angular positions, such as selected broadcast station tuning points, the single wiper contact of the first described arrangement is replaced by a plurality of adjustable but normally fixed position wiper contacts any chosen one of which can be made an operative part of the motor drive system by operation of selector switch means such as a multiple element push button device. The operation is similar to that already described, the power drive being energised to rotate the controlled shaft, to which the segment-carrying first member is secured, until the insulated gap thereof registers with the energised wiper contact.

In accordance with the broadest aspect of the present invention electric control means for controlling the position of a power driven movable object comprise position-sensing means in the form of a switch device having a wiper member movable relatively to a member carrying a plurality of separate spaced electric contacts, means for mechanically coupling said object to one of said switch members whereby the position of said wiper member with relation to said co-operating contacts is determined by the instantaneous position of said movable object, position-control means in the form of a switch device electrically interconnected with said plurality of contacts, said position-control switch device being arranged so that said contacts may be connected together to form separate first and second groups disposed respectively on opposite sides of a desired setting position and drive control circuit arrangements interconnected with said position-sensing and position-control switch devices and adapted to cause forward or reverse movement of the movable object by the power drive according to whether said wiper member is in contact with said first group or said second group of contacts in a manner which provides movement of such wiper member towards said setting position. The position-control switch means may be a manually operable control switch or other equivalent switching means such as relays operable by control signals provided, for instance, by a programming device.

The position-sensing switch device is preferably in the form of a rotary switch having its separate sector-shaped contacts arranged around a circular path of 360° arc and with the related wiper member freely rotatable.

With such an arrangement according to the invention, the number of discrete setting positions available is limited to the number $n$ of contacts provided in the position-sensing means and unless $n$ is made very large the arrangement may be of limited practical utility.

In accordance with a further feature of the invention, a second and generally similar position-sensing switch device is connected to the first by way of a reduction gear train or the like having a ratio of $p:1$ and a second position-control switch device provided in association with said second position-sensing switch device together with circuit control means by which the registration of the wiper member of the second position-sensing switch device with the setting position as chosen by the second position-control switch device causes the transfer of the control of the power drive system to said first position-sensing and position-control devices. In this way the number of discrete setting positions and the accuracy of positioning is increased by a factor of $p$. If the controlled object such as a rotatable shaft is coupled directly to the first sensing device, this arrangement provides a range of $n$ positions in each of $p$ revolutions of the shaft. If, on the other hand, the controlled shaft is coupled directly to the second sensing device, the arrangement provides a range of $n \times p$ steps within one revolution of the shaft. By using still further sensing and control devices connected serially by way of further reduction gear trains the range of discrete setting positions and the accuracy of positioning may be further extended.

In accordance with yet another feature of the invention the wiper member of the position-sensing switch device is constituted by a plurality of separate wiper brushes or equivalent pairs of brushes each covering an appropriately extended arc less than that of one of the co-operating contact sectors and each progressively displaced angularly, separate switch means being then provided for selectively connecting only one of said brushes or combination of brushes in the motor drive control circuit. Thus, if two sets of brushes, each comprising $q$ brushes, are provided, the brushes in each set being spaced to subdivide a contact sector into $q$ equal parts, and the two sets of brushes being spaced relative to one another by an angle a little less than that of a contact sector, and the associated switch means permit the selective connection of brushes 1 in both sets, 2 in both sets, 3 in both sets . . . q in both sets, then each of the n positions afforded by the n sectors of the sensing means is effectively subdivided into q parts giving a range of n×q setting positions.

In many practical applications of the invention, n, p and q referred to above are made of value 10 thereby rendering the system readily operable with a decimal numbering scheme but other values may obviously be assigned to such integers.

In order that the nature of the invention may be more readily understood, a number of embodiments thereof will now be described by way of illustrative example only and with reference to the accompanying drawings in which:

FIG. 3 is a circuit diagram of one practical arrangement according to the invention.

FIG. 8 is a fragmentary circuit diagram showing the manner of modification of the circuit arrangements of FIG. 3 to permit an alternative form of operation, while FIG. 9 is a fragmentary circuit diagram, similar to FIG. 8, illustrating another alternative form of operation.

Figure 1:
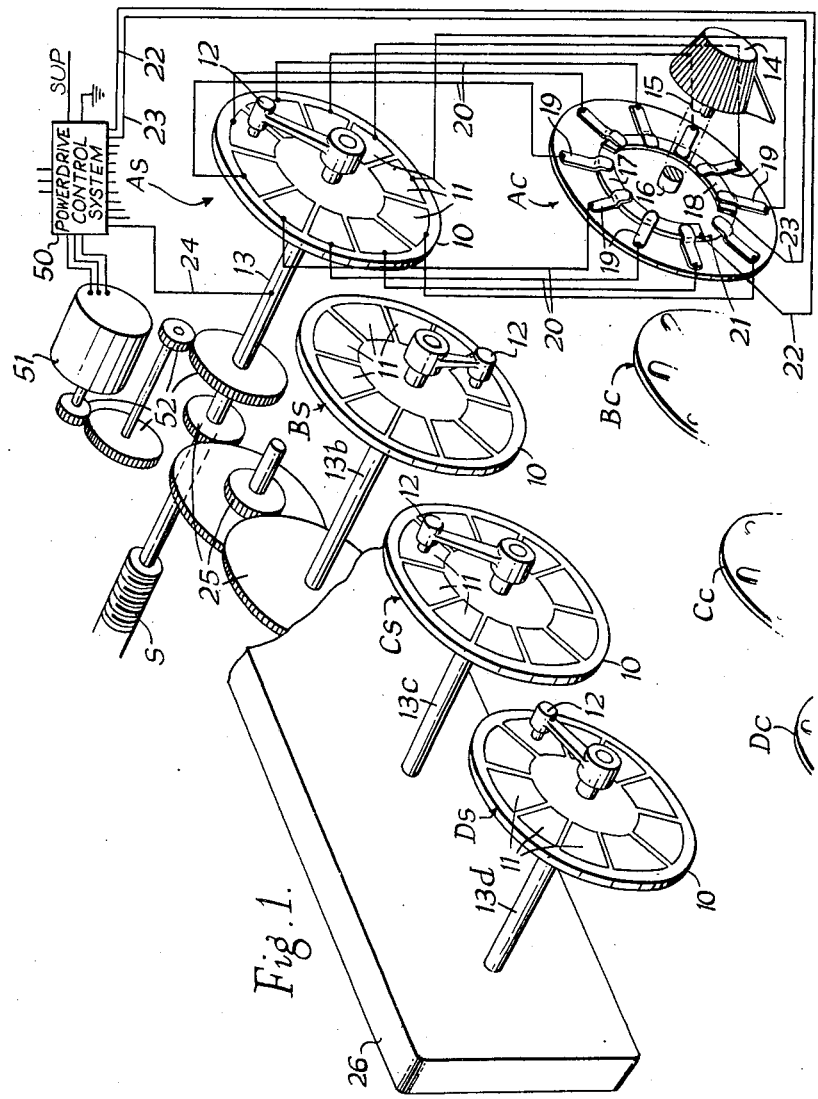
FIG. 1 is a fragmentary perspective view, largely diagrammatic in form, of a relatively simple embodiment of the invention.

Referring first to FIG. 1, a first position-sensing device, indicated at A$s$, comprises a stationary mounting plate 10 of insulating material upon which are mounted ten equi-arc sector plates 11 around the circular spindle 13. A first position-control device, indicated at A$c$, is associated with this sensing device and comprises a rotary ten-position switch having a control knob 14 connected to switch shaft 15 carrying an insulating rotor plate 16 upon which are mounted two arcuate contact plates 17 and 18. The latter co-operate with ten equi-spaced fixed contacts 19 which are individually interconnected by leads 20 with a related one of the sector plates 11. The contact plates 17, 18 should, ideally, bridge $n-1/2$ of the sector plate contacts but in the present case, when $n=10$, one plate 17 is made to bridge four sector plate contacts 19 and the other plate 18 is made to bridge five sector plate contacts 19 leaving a neutral or insulated gap 21 opposite one contact 19 at any one of the ten setting positions of the knob 14.

The contact plate 17 is connected by way of lead 22 to operate those elements of the motor drive system, indicated schematically at 50, to cause the power drive, shown as electric motor 51 in driving connection with the spindle 13 through gear train 52, to rotate the spindle 13 in one (anti-clockwise) direction of rotation while the contact plate 18 is similarly connected by way of lead 23 to those elements of the motor drive system 50 which will cause rotation of spindle 13 in the reverse (clockwise) direction whereby the wiper brush 12 moves to the isolated plate 11 by the shortest available path. The motor drive circuits are completed by way of lead 24 from wiper brush 12.

In the operation of this simplest arrangement a control circuit of the motor drive control system 50 is completed over lead 24 and wiper brush 12 to the particular sector plate 11 upon which it rests and thence by way of the associated fixed contact 19 to one or other of the contact plates 17, 18, depending upon the position of the control knob 14, thereby energising one of the leads 22, 23. The motor drive control system is accordingly operated to produce rotation of the spindle 13 in the appropriate direction necessary to bring the wiper brush 12 nearer to the particular (neutral) sector plate 11 which is interconnected with the fixed contact 19 lying opposite the gap 21 on the rotor plate 16. When this sector plate 11 is reached by the wiper brush 12, the motor drive control circuit is de-energised and the spindle 13 comes to rest in the angular position defined by the setting of the control knob 14. Although not so shown, with such simplest arrangement the angular extent of the contact surface of the wiper brush 12 should equal the angular width of each sector plate 11 if the final rest positions obtained upon approach with either sense of rotation are to coincide while even then the number of discrete setting positions available is clearly limited to $n$, where $n$ is the number of sector plates 11 of the position-sensing device A$s$. In the case illustrated where $n=10$, the various setting positions are 36° apart over one revolution of the spindle 13.

In order to increase the number of discrete setting positions and hence the final accuracy of positioning of the movable object such as a shaft coupled to the arrangement, further position-sensing and position-control device such as are shown at B$s$ and B$c$ and at C$s$ and D$s$ are added. The spindle 13 of position-sensing device A$s$ is coupled to the spindle 13$b$ of sensing unit B$s$ by way of a reduction gear train 25 having, in the decimal number system illustrated, a reduction ratio of 10:1. Position-sensing device B$s$ is similarly coupled to position-sensing device C$s$ by a further 10:1 reduction gear train within casing 26 and such position-sensing device C$s$ likewise coupled to position-sensing device D$s$ by a further 10:1 reduction gear train. Electric circuit arrangement, described later, are provided whereby control of the motor 51 within the drive control system 50 is first vested in the sensing and control devices D until the wiper brush 12 thereof reaches the selected neutral sector plate 11 whereupon such control is transferred to the sensing and control devices C until the wiper brush 12 thereof reaches the selected neutral sector plate 11. Control is then transferred in similar manner to the sensing and control devices B and finally from the latter to the sensing and control devices A.

If, as shown, the shaft S which is to be controlled is coupled to the spindle 13 of the first sensing device A$s$, the respective setting positions of the control switch devices D$c$, C$c$, B$c$ and A$c$ will define respectively hundred, ten, unit and 0.1 turn steps of the shaft with respect to a given zero or datum position. Thus, if the existing setting positions of such control switch devices are respectively 1, 0, 0, 0 and this setting combination is altered to 2, 0, 0, 0, the controlled shaft S will execute 100 turns to an accuracy of not less than 0.1 turn in order to bring all of the wiper brushes 12 of the position-sensing devices back to their neutral sector plates.

It will be clear that, for proper operation, the wiper brush 12 of the position-sensing device C$s$ must be within less than ±180° of its final position before motor drive control is transferred thereto from the previous sensing device D$s$ otherwise the direction of rotation of the associated spindle 13 (and the interconnected shaft S) towards the neutral sector may be incorrect; for example, in the case where the required setting of the position-control device associated with the position-sensing device C$s$ is 9 and the spindle 13$d$ of position-sensing device D$s$ is moving forwardly from a lower value, the wiper brush 12 of position-sensing device C$s$, instead of advancing from, say, position 3 through 4, 5, 6, 7, and 8 to neutral plate 9, may return from position 3 through 2, 1, and 0 to neutral plate 9. The accompanying return movement of the brush 12 of position-sensing device D*s* from its neutral sector plate to its next lower sector plate is no longer significant since this device has now abandoned control. Even if the circuit arrangement is such that it may regain control, hunting will arise with control being transferred repeatedly between position-sensing and control devices D and C. Similarly, the wiper brush 12 of sensing device B*s* must be within ±180° of its final position before control is transferred thereto from sensing device C*s* and the wiper brush 12 of sensing device A*s* must be within less than ±180° of its final position before control is transferred thereto from sensing device B*s*.

With the 10:1 gear train ratios employed in the present example this implies that control from any one sensing device to the next sensing device cannot safely be transferred until the wiper brush of the actual operative sensing device is within ±18° of the correct final setting. When a suitable allowance is made for manufacturing tolerances, back-lash in gearing and the like, an accuracy of better than ±10° is desirable.

With the ten-sector system at present being described, each sector plate 11 has an angular spread of 36° and if a narrow wiper brush is employed and if transfer occurs immediately the neutral sector plate is reached the minimum positional error at the instant of transfer is ±18°. This error can be reduced by the use of a wide-angle brush embracing an arc of, say, 16° or by the use of two narrow brushes connected in parallel and separated by such an angle of 16°. The error may then be reduced to the desired ±10°.

Such accuracy of setting is obtainable, however, only for DCBA setting numbers such as 0000, 1000, 2000 . . . 9000. With intermediate setting numbers, such as 1700, the error at the instant of transfer of control from devices D to devices C rises to considerably more than the desired ±10° or even the maximum permissible error of ±18°.

According to a further feature of the invention this difficulty may be overcome by providing a number of wide-angle brushes or brush pairs suitably displaced angularly with respect to one another and by then selecting an appropriate one of such brushes or brush pairs for operative use according to the setting position of the control switch of the next successive position-control device. Thus, if ten separate brushes or brush pairs, each embracing a relatively wide angle such as 16° or even 35°, are employed each brush or brush pair is displaced by an angle of 3.6° with respect to its predecessor.

Figure 2:
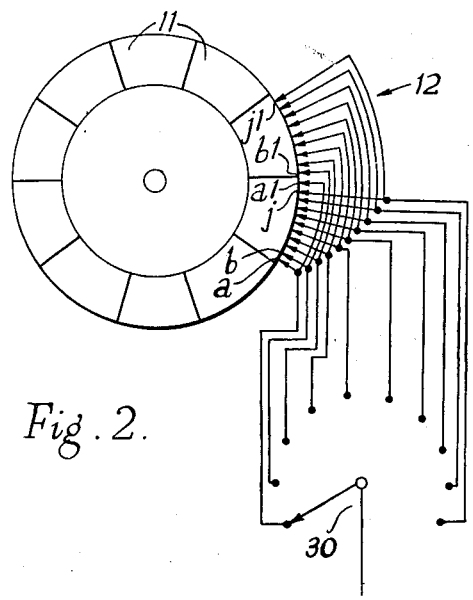
FIG. 2 is a diagrammatic view of a modified construction of position-sensing switch device.

FIG. 2 of the accompanying drawings illustrates schematically one modified form of the position-sensing devices D*s*, C*s* and B*s* for use in such a system and in which each single contact wiper brush 12 of the previously described construction is replaced by a wiper member 12 employing ten pairs of brushes *a* and *a*1, *b* and *b*1 . . . *j* and *j*1, each pair being connected in parallel and to one contact of a ten-point selector switch 30, the adjustable contact member of which is coupled to the position-control switch of the next control device, for operation in unison therewith. Each brush pair, such as *a*, *a*1, embraces an angle of just less than the 36° and each pair is successively displaced angularly by 3.6°. By appropriate adjustment of the meshing of the interconnecting gear trains, such as shown at 25 in FIG. 1, it can be arranged that the particular brush pair which is selected for operative use by means of the selector switch 30 has a position such that the associated wiper member is brought to rest in a position where the interconnected wiper member 12 of the next following sensing unit is in the immediate vicinity of the particular sector plate which has been rendered the neutral plate by the setting of associated control device, i.e. that which is coupled to and controls the switch 30.

By providing the final position-sensing device A*s*, FIG. 1, with a multiple brush wiper member 12 as described above with reference to FIG. 2, increased final accuracy of positioning may be obtained by means of the associated selector switch 30 which then becomes an independent control switch capable of effecting sub-division of the 36° unit steps of the spindle 13 into ten steps of 3.6° each.

The modified system as shown in FIG. 2 also provides a simplified manner of obtaining fine position control by means of only one pair of sensing and control devices plus one further selector switch 30.

The accuracy of positioning afforded by the use of ten wide-angle brushes or ten brush pairs as shown in FIG. 2 is in excess of normal requirements and considerable simplification can be effected with the decade scheme being discussed by using, say, seven separate angularly-spaced brushes each, say, 7.2° apart and then arranging for the selector switch 30 associated with the following position-control device to make appropriate selection from among these seven brushes to provide an energized brush pair in an appropriate angular location with respect to the spindles 13, 13*a*, 13*b* or 13*c* on which the brushes are carried.

One arrangement of this kind is shown in FIG. 3, which also illustrates one arrangement of electric circuit details of the motor drive control system 50 for providing transfer of control from one pair of sensing and control devices to the next during the progressive setting of the controlled shaft into the required angular position.

As shown in FIG. 3, the position-sensing switch device D*s* has a wiper member 12*x* comprising seven separate narrow brushes angularly spaced from one another by an angle of 7.2°, whereby they cover an arc of 43.2°. The co-operating sector plates 11 are connected, in a manner similar to that of FIG. 1, to the associated position-control switch device D*c* although the actual switch formation of the latter is slightly different consisting of four substantially quadrantal contact plates interconnected diametrically in pairs and co-operating with 10 fixed contacts concentrated within a 180° arc. The seven brushes of the sensing device D*s* are connected each to separate adjacent pairs of a 14-contact 10-position selector switch 30*c* which is mechanically coupled to the operating spindle 13*c* of the position-control switch device C*c*. The rotor of switch 30*c* has two angularly spaced contacts whereby any pair of alternate brushes of the seven available on the wiper member 12*x* of the position-sensing device D*s* may be interconnected and used as a single brush connected to the lead 24. Thus, brushes 1 and 3, brushes 2 and 4, brushes 3 and 5, brushes 4 and 6 or brushes 5 and 7 may be employed and these are arranged to be used respectively with the digit setting positions 0 and 1, 2 and 3, 4 and 5, 6 and 7 and 8 and 9 of the position-control device C*c*, one brush pair serving for two adjacent setting positions. The corresponding position-sensing devices C*s*, B*s* and A*s* are similarly provided with wiper members 12*x* comprising seven angularly spaced brushes. Those of the position-sensing devices C*s* and B*s* are interconnected with similar multi-point selector switches 30*b* and 30*a* associated respectively with the next lower order position-control switch devices B*c* and A*c*, while the brushes of the wiper member 12*x* of the final position-sensing device A*s* are connected to a separate further multi-point selector switch 30 which serves to afford an additional fine setting control.

The position-sensing switch device A*s* will serve to determine the final position of the shaft to the nearest 0.1 of a turn or 36°±a transfer error of 36−14.4/2 degrees, that is ±10.8° maximum. By the use of the further selector switch 30, however, the fineness of setting can be increased by a factor of 5 by appropriate selection of the operative brush pair on the wiper member 12*x* of the position-sensing device A*s*.

The circuit arrangements shown comprise operating relays D/2, C/2, B/2 and A/2 arranged in the leads 24 completed to ground from each of the brush selector switches 30c, 30b, 30a and 30, respectively, while the leads 22 and 23 from each of the position-control switch devices Dc, Cc, Bc and Ac are connected to the control current supply line SUP by way of individual resistors R2 and R1 respectively. A pair of controlled change-over contacts d1, d2 associated with the relay D/2 control respectively the connection of further relays E/1 and F/1 either to the leads 33 and 32 when relay D/2 is de-energised or to the aforesaid leads 23 and 22 when such relay D/2 is energised. The controlled contacts c1 and c2 of the relay C/2 similarly control the connection of the leads 33 and 32 either to the leads 23 and 22 from the position-sensing device Cs when the relay C/2 is energised or to further leads 35 and 34 when such relay C/2 is de-energised. The controlled contacts b1 and b2 of relay B/2 likewise control the connection of the aforesaid leads 35 and 34 either to the leads 22 and 23 from the position-sensing device Bs or when such relay B/2 is de-energised to further leads 37 and 36 which latter terminate at the controlled contacts a1 and a2 of relay A/2 which govern their connection to or disconnection from the respective leads 22 and 23 of the position-sensing switch device As. The relays E/1 and F/1 respectively control contacts e1, f1.

The contact e1 controls the supply of operating current from the supply line SUP to the forward or clockwise-run contactor 54 supplying operating current to the power drive motor 51 while the other contact f1 similarly controls the supply of operating current from the supply line SUP to the reverse or anti-clockwise run contact 55 supplying operating current to the motor 51. Thus, according to which of the relays E/1 or F/1 is energised, the motor 51 will provide either clockwise or anti-clockwise rotation of the controlled shafts.

The operation of the arrangement upon any alteration of the position-control devices to a new setting combination is as follows. Initially relays D/2, C/2, B/2 and A/2 are energised by current flowing from the supply line SUP to earth through the associated position-control and position-sensing switch devices Dc, Ds, Cc, Cs, Bc, Bs and Ac, As and the selector switches 30c, 30b, 30a and 30. The consequent reversal of contacts d1, d2 causes energisation, according to the particular previous position of the wiper member 12x of the position-sensing device Ds, of one or other of the relays E/1, F/1 to produce either clockwise (forward) or anti-clockwise (reverse) motion of the shaft S with accompanying movement of such wiper member 12x towards the new selected neutral sector plate 11. Upon arrival of the selected brush pair of the wiper member 12x of the position-sensing device Ds at such neutral sector plate 11, the relay D/2 is de-energised and the control circuits of the relays E/1, F/1 are transferred, by reversal of contacts d1, d2, to the position-sensing and position-control devices Cs and Cc and the operation is repeated in substantially similar manner to transfer control to the next position-sensing and position-control devices Bs and Bc and so on at a later instant to the position-sensing and position-control devices As and Ac. When the wiper member 12x of the final position-sensing device As comes to rest with its selected brush pair on the neutral sector plate 11, the shaft S is in the position defined by the setting of the four position-control switch devices Dc, Cc, Bc, Ac and the fine setting selector switch 30.

The effect of over-run of the power drive motor 51 is normally to decrease the transfer error. In many instances it may be desirable for the final approach of the movable object to the required position to be made always from one direction as the effects of motor over-run and the error due to the operative wiper brush or brush pair not embracing nearly the entire neutral sector plate can then be allowed for with resultant increase of overall accuracy of final setting. Approach from one direction is also desirable when the arrangement is used in conjunction with a device such as a lead screw since the back-lash of the lead screw itself is then always taken up in the same direction. Such final approach always from one direction may be achieved by providing an intentional over-run when approaching from the opposite direction so that reverse rotation in the chosen approach direction is always necessary before the final setting point is reached.

Figure 6:
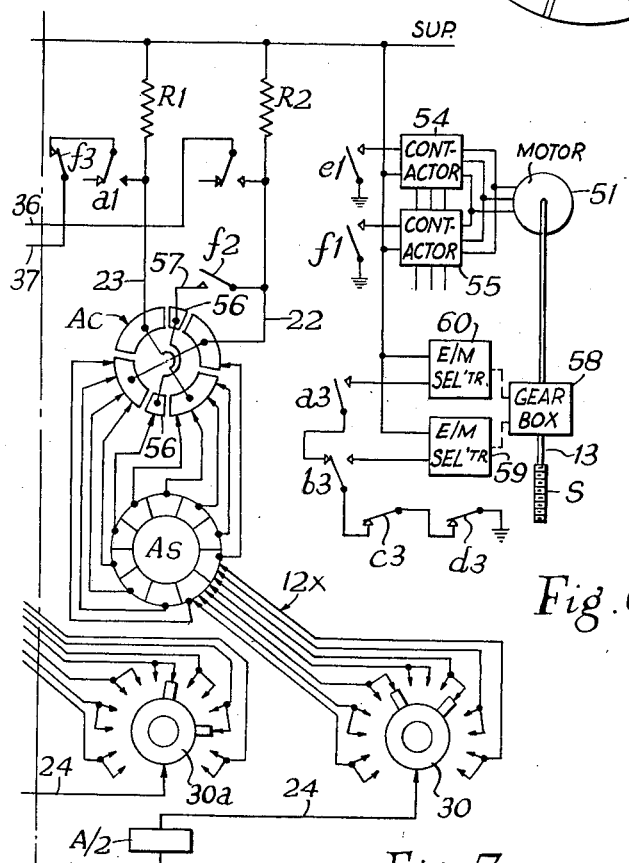
FIG. 6 is a fragmentary circuit diagram showing a possible modification of the circuit arrangements of FIG. 3 in order to provide for the final approach to the desired setting position to be always in a given direction and to permit alteration of the speed of rotation of the movable shaft at different stages of the approach movement.

One simple method of achieving this is illustrated in FIG. 6 which shows a modified form of the arrangements associated with the final position-sensing and position-controlling devices of FIG. 3. In this modification, the position-control switch device Ac is provided with additional diametrically opposed and interconnected contact plates 56, by which that contact sector which is chosen as the eventual neutral sector is connected by way of lead 57 and normally-open contacts f2, additionally provided on the relay E/1, to the lead 22.

The operation of this modification during the final stage of setting movement is as follows. The chosen approach direction is clockwise or forwards. If, at the instant of transfer of control from devices Bs and Bc, the selected wiper brushes of wiper member 12x of the position-sensing device As rest upon those sector plates 11 which are connected through the position-control device Ac to lead 23, relay E/1 is energised and approach movement in the chosen forward direction takes place until such wiper brushes rest upon the contact plates 56. As relay F/1 is not energised, contacts f2 are open and such contact plates 56 are isolated so that the final balance or setting position is reached exactly as already described. If, however, at the instant of transfer, the selected wiper brushes rest upon those sector plates 11 which are connected through the position-control device Ac to the lead 22, relay F/1 is energised to produce reverse or anti-clockwise movement of the shaft S and movement in this direction is continued even when the selected brushes of the wiper member 12x move on to the sector plate 11 which is chosen as the eventual neutral plate. This is due to the now-closed state of contacts f2. Such reverse movement continues until the wiper brushes have passed over the selected sector plate 11 whereupon relay F/1 becomes de-energised and relay E/1 energised in its place. Movements in the opposite direction, i.e. the required forward or clockwise direction, now takes place back on to the selected neutral sector plate 11 which is at this time isolated by the opening of contacts f2. To prevent simultaneous energisation of both relays E/1 and F/1 when the wiper brushes connect earth to both of the leads 22, 23, the lead 37 preferably includes normally-closed contacts f3 also controlled by the relay F/1. While relay F/1 is energized these contacts are open and prevent energisation of relay E/1.

An important factor on motor over-run and therefore on final setting accuracy is the approach speed and in a system as described above in which a number of stages each more closely approaching the correct setting position are employed, the change of transfer of control from one sensing unit to the next may be arranged to provide a different shaft speed simultaneously therewith either by suitable electrical control of the driving motor or by the selection of different driving gear ratios between the motor and the shaft so that the approach speed is progressively decreased as the final setting position is approached.

One simple arrangement for this purpose is also illustrated in FIG. 6, where the drive motor 51 is shown coupled to the spindle 13 and shaft S through a 3-speed gearbox 58. This gearbox is arranged normally to provide a high speed drive but is capable of being altered to provide a medium speed drive upon energisation of a first electromagnetic gear selector device 59 or, alternatively, to provide a low speed drive upon energisation of a second electromagnetic gear selector 60. The control circuit of selector device 60 is by way of normally open contacts a3 controlled by relay A/2 (FIG. 3), the normally closed side of changeover contacts b3 controlled by relay B/2 and the normally closed contacts c3, d3 controlled respectively by relays C/2 and D/2 (FIG. 3). The control circuit of selector device 59 is by way of the opposite, normally open, side of contacts $b3$ and thence through contacts $c3$ and $d3$.

In the operation of this arrangement, during the first setting stage at least relay D/2 is energised and as a result contacts $d3$ are open and neither selector device 59 or 60 can be operated and the gearbox 59 provides a high speed drive. Similarly, during the second stage at least relay C/2 will be energised to open contacts $c3$ and again high speed drive is provided. When relay B/2 is energised, however, contacts $b3$ change over and as relays D/2 and C/2 are now de-energised with resultant closure of contacts $c3$, $d3$, the selector device 59 is energised to cause gearbox 58 to provide a medium speed drive. When relay B/2 becomes de-energised and relay A/2 energised in the final setting stage, contacts $d3$, $c3$ and $b3$ fall back to their normal closed state and contacts $a3$ close to energise device 60 instead of device 59 so that low speed drive is provided.

If desired, a further progressive control of speed during the setting of any sensing unit itself may be achieved at the expense of additional complication by arranging that the motor drive speed shall decrease as the sector plate under the wiper brush system approaches that of the selected neutral sector plate.

Figure 4:
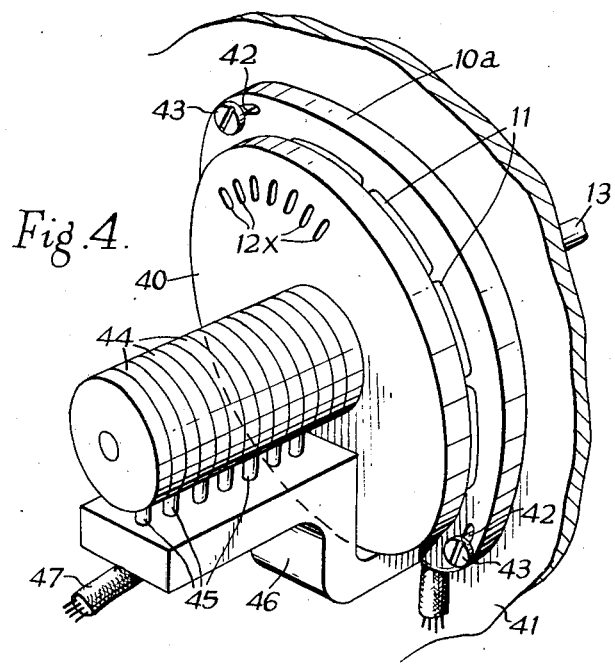
FIG. 4 is a perspective view illustrating one form of position-sensing switch device employing a plurality of wiper brushes.

One possible constructional form of the position-sensing switch device embodying a plurality of brushes is shown in FIG. 4, where the brushes $12x$, such as a group of seven spaced at 7.2° intervals, are carried on a rotatable disc 40 of insulating material rigidly connected to the spindle 13, such brushes being aligned to sweep over the various sector plates 11 mounted upon the stationary carrier body 10a which is, however, preferably arranged for slight arcuate adjustment with respect to a mounting plate 41 by means of the slots 42 and screws 43. Each of the brushes $12x$ is connected to a separate slip ring 44 carried on an extension of the spindle 13, such slip rings being engaged by stationary brushes 45 carried by a fixed bracket 46 and connected to individual leads in a multiple output conductor 47.

Figure 5:
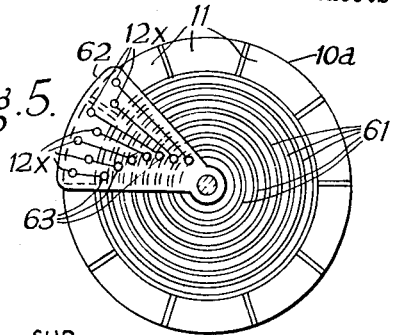
FIG. 5 is an elevational view of an alternative form of position-sensing switch device according to the invention.

FIG. 5 illustrates an alternative form of position-sensing switch device for use as the devices $Ds$, $Cs$, $Bs$ and $As$ and which comprises a stationary or slightly adjustable carrier body 10a upon which is mounted the circular group of sector plates 11. These surround a group of seven concentric and circular slip rings 61 from which connections extend to the associated selector switch 30. The co-operating wiper member 62 is provided with a group of seven separate wiper brushes $12x$ each of which is cross-connected within the wiper member 62 to an individual contact brush 63. The respective brushes 63 each bear upon a different one of the slip rings 61. Such a construction is relatively simple and is capable of manufacture by printed-circuit methods.

A further feature of the invention relates to the provision of means for correcting small errors in the mechanical system associated with the positional control. For instance, if the shaft S is a lead screw, small errors in such lead screw as may occur at different parts of its length may be corrected thereby to afford an overall positional accuracy of the object controlled by the lead screw which is comparable with that obtainable by very much more complex methods employing independent measuring standards. One method of obtaining such correction of errors in the controlled system is to provide a cam operated from the spindle of the most coarse position-sensing device, e.g. device $Ds$, and to utilise the lift afforded by this cam to cause rotation over a small angle of the normally fixed part of the finest position-sensing device, e.g. the device $As$. Thus, in the case where the controlled system is a lead screw having a pitch of 0.1″, angular movement by 3.6° of the normally fixed part of the position-sensing device $As$ will automatically provide a correction of 0.001″. It is readily possible to obtain such 3.6° movement of the fixed part of the sensing device by each 0.1″ of cam lift and as the spindle of the position-sensing device $Ds$ represents, by its one complete revolution, a complete traverse of the controlled object on the lead screw, such spindle can be provided with a cam which is cut to correct any inaccuracies of the lead screw throughout its length. According to the cam position and hence according to the particular part of the lead screw in operative use at any time so the position of the normally-fixed part of the first sensing device $As$ can be slightly adjusted to correct for any determined inaccuracy of the lead screw.

Figure 7:
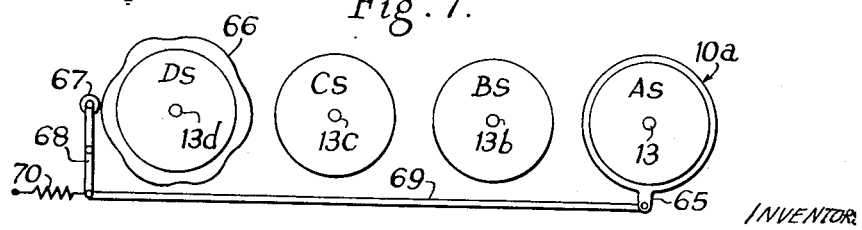
FIG. 7 is a schematic view illustrating an error-correction arrangement.

FIG. 7 illustrates, schematically, one error correcting arrangement of the above kind. The carrier body 10a upon which the sector plates 11 of the position-sensing switch device $As$ are carried is arranged to be capable of limited arcuate movement about the axis of the associated wiper-carrying spindle 13 and is provided with a projecting lug 65. The spindle $13d$ associated with the position-sensing switch device $Ds$ has secured thereto a cam disc 66 whose contoured peripheral surface is engaged by a follower roller 67 carried at one end of a pivoted lever 68. The opposite end of the lever 68 is coupled by link arm 69 to the lug 65. Spring means 70 maintain roller 67 in contact with the cam 66.

As the cam 66 rotates during movement of the spindle $13d$ and the interconnected driven shaft S, so different regions of the cam profile will come under the follower roller 67. By appropriate shaping of such cam profile, rocking movement of the carrier body 10a by an amount suitable to correct any positional errors may be provided.

An alternative method of correction is to control the angular position of the operative wiper brush pair selected for use in the final position-sensing device $As$, in accordance with the position of the coarse position-control device such as $Dc$. Such method is obviously less flexible than the cam method previously referred to.

Although, in the arrangements so far described the setting or balance point in each position-sensing device has been defined by the selected position of a neutral or isolated sector plate or contact of the plurality of such plates or contacts swept over by the relatively movable wiper member other arrangements are possible including those illustrated in FIGS. 8 and 9.

FIG. 8 shows one re-arrangement of the circuits associated with the final position-sensing and position-control devices $As$ and $Ac$ of FIG. 3. The other stages are modified in a similar manner which will be self-evident.

In this modification the position-control switch device $Ac$ is arranged so that there is no neutral or isolated sector plate 11 in the interconnected position-sensing device $As$, the plates 11 of the latter being connected as two groups of five plates each with one of the divisions between the two groups (governed by the assigned directions of motor drive control) representing the required balance position. The respective motor control relays E/1 and F/1 (FIG. 3) are connectible, as before, over leads 23, 22, one to each group of sector plates, while the associated selector switch 30 is arranged to connect two selected wiper brushes to earth through the respective windings of a differential relay A/2. In this instance adjacent wiper brushes are preferably used as shown. The respective energisation circuits of forward-run and reverse-run contactors 54 and 55 now include normally-closed contact $fx$ and the normally-closed side of the change-over contacts $e1$, controlled respectively by the relays F/1 and E/1, and contacts $f1$ and the normally-open side of contacts $e1$.

In operation, the relay E/1 only will be operated to provide forward motion of the shaft S whilst both of the operative wiper brushes rest upon that group of sector plates 11 connected through position-control device $Ac$ to lead 23. Similarly the relay F/1 alone will be operated to provide reverse motion of the shaft S whilst both of the operative wiper brushes rest upon that group of sector plates 11 which are connected to lead 22. When the wiper member 12x reaches the setting position where one wiper brush rests upon one group of sector plates 11 and the other wiper brush rests upon the other group of sector plates 11, both relays E/1 and F/1 will be operated and as a result both contactors 54, 55 will be de-energised to halt the motor drive. Under these conditions the transfer relay A/2 which is operated when only one of its windings is energised, is released to open contacts a1, a2.

FIG. 9 shows another re-arrangement of the final position-sensing and position-control devices As and Ac. As in FIG. 8, the remaining stages, which are not shown, are modified in like manner.

In this modification the sector plates 11 are again divided into two groups of five, of which one group is connected into the control circuit and the other is left disconnected, one of the divisions between the two groups representing the desired setting or balance position. The position-control device Ac is arranged as shown to complete a circuit to earth through one winding of a differential relay A/2 whose other winding is constantly supplied with a current equal to that of one only of the relays E/1 or F/1 by way of resistor Rx from the supply line SUP. The separate adjustable contacts of selector switch 30 are now connected to the leads 22, 23.

In the operation of this arrangement, the presence of both of the selected wiper brushes on the group of sector plates 11 which are connected to earth over lead 24 and relay A/2 will cause operation of both relays E/1 and F/1. This will close contacts e1 and f1 whereby contactor 54 is operated to produce forward running of the motor 51. Since the left hand winding of relay A/2 now carries the doubled value current of the two operated relays E/1, F/1, it also is operated. If the two selected wiper brushes rest upon the other group of sector plates 11 which are disconnected, then both relays E/1 and F/1 become de-energised. This causes operation of the reverse-run contactor 55 through contacts ex and f1. Relay A/2 remains operated due to the current supply through resistor Rx. When the selected wiper brushes rest one upon the earthed group of sector plates 11 and the other upon the disconnected group, one of relays E/1, F/1 will be operated and the other released whereby neither contactor 54 nor 55 will be operated and the motor 51 halted. Since relay A/2 is now energised by equal currents in its two differential windings, it also releases and opens contacts a1, a2.

Although the invention has been more particularly described with relation to a decimal system of numbering it will be obvious that it may be modified to use other systems of numbering and control. Similarly, the invention may be used for the control of objects other than rotary elements such as shafts. The linear position of an object upon a particular path may be controlled by suitable linkage with arrangements similar to those described. Similarly, although the system has been described using rotating brushes and fixed segments, it could equally well utilise rotating segments and fixed brushes and various alternative combinations providing similar effective electrical connections.

A particular application of the invention is to automatic co-ordinate setting of a work table beneath a drill head. In such application two complete systems as described are provided for controlling the two lead screws which control the positioning of the work table on the X and Y ordinates. The respective switch shafts 15 of the different position-control switch devices are connected to stepping or impulse motors of known type which automatically seek a particular position indicated by energisation of a chosen input. Alternatively the required connections may be obtained by interconnecting the contacts of groups of relays, different prescribed operating combinations of which represent the different required digits. In such an arrangement the contact connections replace the connections to the rotary control switches.

The necessary control voltages for such motors or relays are derived from a prepared porgram such as a punched tape, the latter being automatically fed forwards stage by stage as each drilling operation is completed.

We claim:
1. Electric control means for controlling the position of a power driven movable object which comprises a position sensing switch device including a first member having a plurality of separate spaced electric contacts and a second wiper contact member movable relatively to said first member to cause said wiper contact member selectively to engage with any one of said spaced contacts, coupling means for mechanically connecting said power driven movable object with one of said first and second members whereby the position of said wiper contact relatively to said spaced contacts is determined by the instantaneous position of said movable object, a position control switch device having a plurality of switching positions each defining a different adjustment position of said movable object, said position control switch device including contact means interconnected with said spaced contacts of said position sensing switch device for connecting said spaced contacts into two parallel-connected groups located respectively one group on each side of a desired setting location, the position of said setting location and the positions of said groups of parallel-connected spaced contacts being variable and determined by the switching position of said position control switch device and electrically operated drive control arrangements for the power drive for said movable object, said drive control arrangements including a forward drive control circuit completed through one of said parallel-connected groups of spaced contacts and said wiper contact and a reverse drive control circuit completed through the other of said parallel-connected groups of spaced contacts and said wiper contact to produce movement of said movable object towards the position where said wiper member is aligned with said setting location.

2. Electric control means for controlling the position of a power driven movable object which comprises a position sensing switch device including a first member having a plurality of separate spaced electric contacts and a second wiper contact member movable relatively to said first member to cause said wiper contact member selectively to engage with any one of said spaced contacts, coupling means for mechanically connecting said power driven movable object with one of said first and second members whereby the position of said wiper contact relatively to said spaced contacts is determined by the instantaneous position of said movable object, a position control switch device having a plurality of switching positions each defining a different adjustment position of said movable object, said position control switch device including contact means interconnected with said spaced contacts of said position sensing switch device for connecting all but one of said spaced contacts into two parallel-connected groups located respectively one group on each side of the remaining isolated contact, the position of said isolated contact and the positions of said groups of parallel-connected spaced contacts being variable and determined by the switching position of said position control switch device and electrically operated drive control arrangements for the power drive for said movable object, said drive control arrangements including a forward drive control circuit completed through one of said parallel-connected groups of spaced contacts and said wiper contact and a reverse drive control circuit completed through the other of said parallel-connected groups of spaced contacts and said wiper contact to produce movement of said movable object towards the position where said wiper member is solely in contact with said isolated contact.

3. Electric control means in accordance with claim 1 wherein said wiper member is provided with a plurality of separate wiper brush means each arranged to make connection with said spaced electric contacts at points which are separated from one another in the direction of relative movement by an amount less than the centre-to-centre spacing of such spaced contacts, said wiper means being staggered relatively to one another whereby collectively they embrace a distance along said direction of relative movement less than twice said centre-to-centre spacing dimension, and wherein said position-control switch device includes means for selecting one of said wiper brush means for interconnection with said drive circuit control arrangements.

4. Electric control means in accordance with claim 3 wherein each of said separate wiper brush means comprises a pair of spaced brushes.

5. Electric control means in accordance with claim 3 wherein said wiper member is provided with a plurality of separate contact brushes equi-spaced along the direction of relative movement and in which said means in said position-control switch device is arranged to select appropriate pairs of said contact brushes.

6. Electric control means in accordance with claim 5 in which said selected pair of spaced brushes are electrically interconnected for operation as a single brush element.

7. Electric control means in accordance with claim 1 wherein the plurality of contacts of said position-sensing switch device are arranged around a circular path of 360° arc, said wiper member being arranged for uninterrupted rotational movement over such circular path by more than one complete revolution in either direction.

8. Electric control means in accordance with claim 7 wherein said position-sensing means comprises at least two of said position-sensing switch devices having their respective movable members interconnected by speed-reduction gearing such that relative movement of the wiper member of the first switch device by one complete revolution is accompanied by relative movement of the wiper member of the second switch device by the spacing distance between adjacent contacts of that device, and wherein said position-control means comprises at least two of said position-control switch devices interconnected respectively with said position-sensing switch devices and wherein said drive control circuit arrangements include means for initially rendering said second position-sensing and position-control switch devices alone operative to control movement of said object until said wiper member of said second position-sensing switch device is positioned at the setting position determined by said second position-control switch device and then substituting said first position-sensing and position-control switch devices for said second switch devices to control further movement of said object until said wiper member of said first position-sensing switch device is positioned at the setting position determined by said first position-control switch device.

9. Electric control means in accordance with claim 8 wherein at least said second position-sensing switch device is provided with said plurality of separate wiper brush means and in which said means for selecting one of such wiper brush means is coupled for conjoint operation with said first position-control switch device.

10. Electric control means in accordance with claim 9 wherein said first position-sensing switch device is also provided with said plurality of separate wiper brush means and in which a separate independently operable switch means is provided for selecting the operative brush means thereof.

11. Electric control means in accordance with claim 10 wherein each position-sensing switch device is provided with ten equi-spaced sector-shaped contact plates and wherein said interconnecting gearing has a transmission ratio of 10:1.

12. Electric control means in accordance with claim 8 which includes error-correcting means in which the first position-sensing switch device is arranged whereby the normally fixed member thereof is mounted for limited oscillatory movement in said direction of relative movement and in which the controlled object is mechanically coupled to a movable cam device, said cam device having cam follower means adapted to produce rocking movement of said normally fixed member of said first position-sensing switch device in accordance with the predetermined error-correcting profile of said cam device.

13. Electric control means in accordance with claim 8 which includes means whereby the final approach to the chosen setting position is always in a predetermined direction of movement of the controlled object.

14. Electric control means in accordance with claim 8 which includes means for reducing the driven speed of the controlled object as it approaches the chosen setting position.

15. Electric control means in accordance with claim 14 wherein change of drive speed is arranged to take place coincidentally with said transfer of control from said second position-sensing and position-control devices to said first position-sensing and position-control devices.

16. Electric control means for controlling the position of a power driven movable object which comprises a position sensing switch device including a first member having a plurality of separate equi-spaced electric contacts arranged around a circular path of 360° arc and a second wiper contact member arranged for continuous rotary movement over said circular path to cause said wiper contact member selectively to engage with any one of said spaced contacts, coupling means for mechanically connecting said power driven movable object with one of said first and second members whereby the position of said wiper contact relatively to said spaced contacts is determined by the instantaneous position of said movable object, a position control switch device having a plurality of switching positions each defining a different adjustment position of said movable object, said position control switch device including contact means interconnected with said spaced contacts of said position sensing switch device for connecting all but one of said spaced contacts into two parallel-connected groups located respectively one group on each side of the remaining isolated contact, the position of said isolated contact and the positions of said groups of parallel-connected spaced contacts being variable and determined by the position of said position control switch device and electrically operated drive control arrangements for the power drive for said movable object, said drive control arrangements including a forward drive control circuit completed through one of said parallel-connected groups of spaced contacts and said wiper contact and a reverse drive control circuit completed through the other of said parallel-connected groups of spaced contacts and said wiper contact to produce movement of said movable object towards the position where said wiper member is solely in contact with said isolated contact.

17. Electric control means for controlling the position of a power driven movable object which comprises a plurality of position sensing switch devices each including a stationary member having a plurality of separate equi-spaced electric contacts arranged around a circular path of 360° arc and a wiper contact member arranged for rotary movement over said circular path by more than one revolution in either direction to cause said wiper contact member selectively to engage with any one of said spaced contacts, speed-change gearing serially interconnecting said wiper contact members of said position sensing switch devices whereby each successive wiper contact rotates at a speed which is faster than the wiper contact immediately preceding it in the series by a factor equal to the number of said spaced electric contacts, coupling means for mechanically connecting said power driven movable object with one of said wiper contact members of one of said plurality of position sensing switch devices whereby the position of each of said wiper contact members relatively to the associated spaced contacts is determined by the instantaneous position of said movable object, a plurality of position control switch devices, one for each position sensing switch device, each of said position control switch devices having a plurality of switching positions equal to the number of spaced electric contacts and each defining a different adjustment position of said movable object, said position control switch devices each including contact means inter-connected with said spaced contacts of the associated position sensing switch device for connecting said spaced contacts into two parallel-connected groups located respectively one group on each side of a desired setting location, the position of said setting location and the positions of said groups of parallel-connected spaced contacts being variable and determined by the switching position of said position control switch device and electrically operated drive control arrangements for the power drive for said movable object, said drive control arrangements including a forward drive control circuit arranged to be completed through one of said parallel-connected groups of spaced contacts and said wiper contact of each of said position sensing switch devices and the associated position control switch devices in turn and a reverse drive control circuit arranged to be completed through the other of said parallel-connected groups of spaced contacts and said wiper contact of each of said position sensing and position control switch devices in turn to produce movement of said movable object towards the position where the wiper contact member of each of said position sensing switch devices is aligned with the setting location of the associated spaced electric contacts.

References Cited in the file of this patent

UNITED STATES PATENTS

| | | |
|---|---|---|
| 2,662,998 | Witters | Dec. 15, 1953 |
| 2,783,429 | Tauber | Feb. 26, 1957 |
| 2,848,677 | Stockwell | Aug. 19, 1958 |

FOREIGN PATENTS

| | | |
|---|---|---|
| 1,100,147 | France | Mar. 30, 1955 |
| 290,349 | Italy | Nov. 16, 1931 |